United States Patent [19]

Montague

[11] Patent Number: 4,491,903
[45] Date of Patent: Jan. 1, 1985

[54] COMBINATION LOW-PASS FILTER AND HIGH FREQUENCY TRANSIENT SUPPRESSOR

[76] Inventor: Herbert R. Montague, 75 Clifton Blvd., Binghamton, N.Y. 13903

[21] Appl. No.: 613,012

[22] Filed: May 21, 1984

Related U.S. Application Data

[63] Continuation of Ser. No. 442,968, Nov. 19, 1982, abandoned.

[51] Int. Cl.³ .............................................. H02M 1/14
[52] U.S. Cl. ........................................ 363/48; 363/86; 323/230; 333/181; 307/543; 361/111
[58] Field of Search ..................................... 363/44–48, 363/52–53, 86, 126; 333/172, 181; 323/266, 229–230; 307/542–543, 555–559, 561, 565; 361/111, 118

[56] References Cited

U.S. PATENT DOCUMENTS

| | | | |
|---|---|---|---|
| 3,090,017 | 5/1963 | Novic | 363/47 X |
| 3,327,132 | 6/1967 | Cones et al. | 333/181 X |
| 3,510,753 | 5/1970 | Lawn | 363/47 X |
| 3,577,016 | 5/1971 | Weidmann | 363/47 X |
| 4,095,163 | 6/1978 | Montague | 307/318 X |
| 4,152,733 | 5/1979 | Melwisch | 307/543 X |
| 4,156,838 | 5/1979 | Montague | 361/118 X |
| 4,434,396 | 2/1984 | Montague | 361/111 X |

Primary Examiner—Peter S. Wong
Attorney, Agent, or Firm—Lowe, King, Price & Becker

[57] ABSTRACT

Spikes occurring on an AC line and coupled through an AC to DC converter are substantially decoupled from a DC load of the converter even though the converter includes a supply transformer and a shunt electrolytic filter capacitor, by a circuit comprising a shunt network including a bidirectional breakdown means having a predetermined threshold conduction level with a dead band series connected with a capacitor. The capacitor is a low impedance capacitive reactance to high frequency components in pulses developed by the converter in response to the spikes, and a high impedance to ripple of the line derived by the converter. The high frequency components are supplied by the breakdown means to and through the capacitor to momentarily interrupt the flow of current from the converter to the load when the pulses are derived. A low pass filter connected in series with the shunt network and the load has a cut-off frequency lower than the ripple frequency.

21 Claims, 4 Drawing Figures

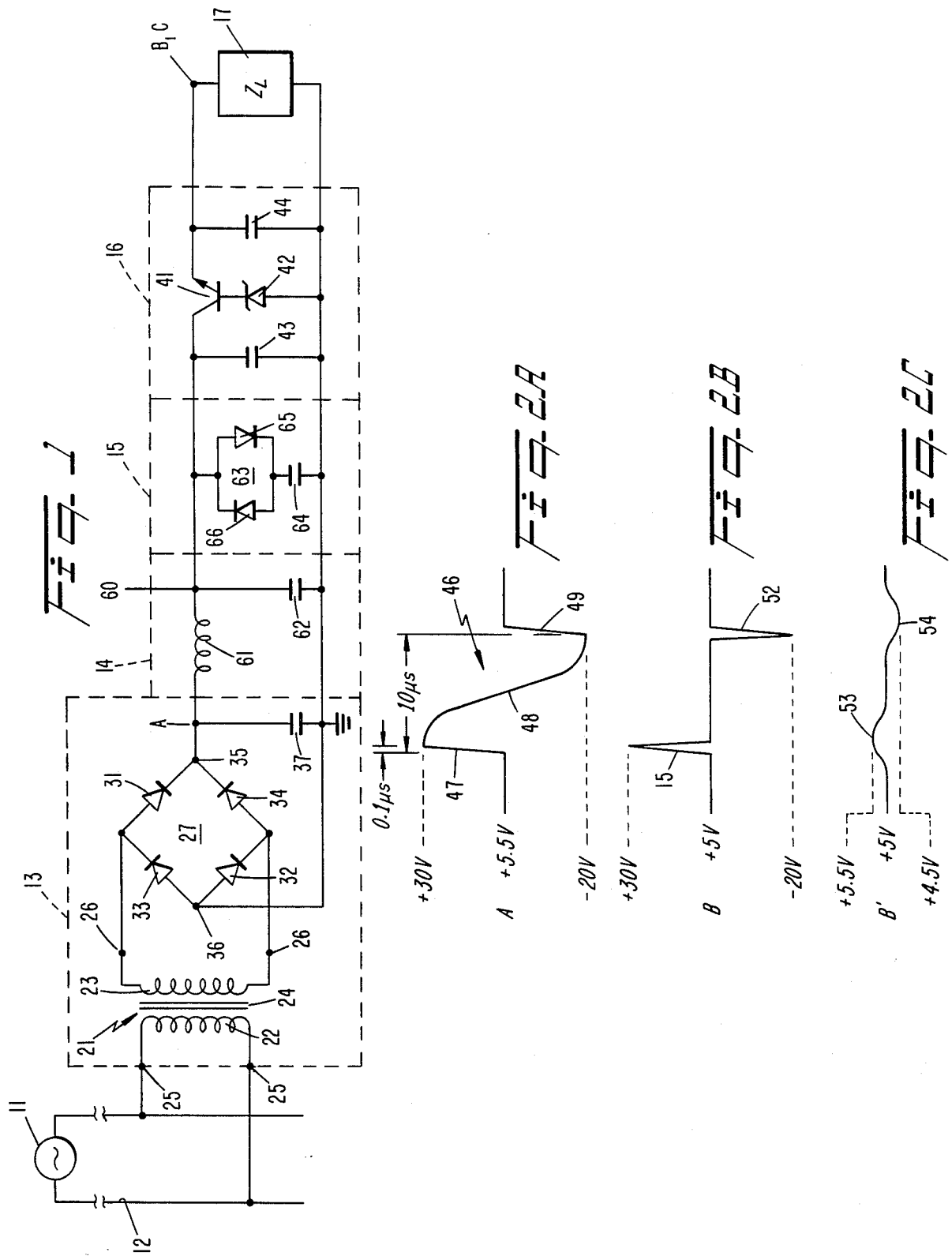

COMBINATION LOW-PASS FILTER AND HIGH FREQUENCY TRANSIENT SUPPRESSOR

This application is a continuation of application Ser. No. 442,968, filed 11/19/82, now abandoned.

FIELD OF INVENTION

The present invention relates generally to a circuit for substantially preventing coupling of spikes occurring on an AC line through an AC to DC converter to a DC load of the converter wherein pulses developed by the converter in response to the spikes are substantially attenuated by a shunt network including bi-directional breakdown means series connected with a capacitor, in combination with a low-pass filter.

BACKGROUND OF THE INVENTION

AC to DC converters usually employ step-down transformers for reducing an AC line voltage, typically 120 volts, 60 Hertz, to an appropriate level, to enable a DC voltage having a value much lower than the AC line voltage to be derived. The transformer includes primary and secondary windings respectively connected to the AC line and across opposite terminals of an AC to DC rectifier, frequently a bridge rectifier. An electrolytic capacitor connected in shunt with output terminals of the rectifier smooths the DC voltage developed by the rectifier into a relatively low ripple DC voltage, typically applied to a DC load by way of a DC regulator. Frequently, output terminals of the regulator and the load terminals are shunted by an electrolytic capacitor.

In response to spikes on the AC line as frequently occur for various reasons, there is a tendency for bipolar pulses to be superimposed on the DC level applied to the DC load by the converter. The bipolar pulses are derived as a result of transient effects of the step-down transformer inductance, and the magnetic field stored in a magnetic core thereof. The bipolar pulse has an amplitude in each direction which is likely to be considerably higher than the DC level developed across the output terminals of the rectifier, and applied to the load. The pulses frequently are characterized by having a leading edge on the order of one-tenth of a microsecond, a bipolar sinusoidal like transition with a duration on the order of ten microseconds, and a trailing edge on the order of one-tenth of a microsecond. The peak-to-peak sinusoidal like variation may be as great as 50 volts, superimposed on the DC level of the rectifier and the load; typically, the DC levels are in the 5 volt range, whereby the bipolar pulse has maximum amplitudes of 30 volts on one side of ground and 20 volts on the other side of ground.

The short duration leading and trailing edges of the bipolar pulses include very high frequency components. The edges have such high frequencies that the electrolytic capacitor does not respond to them as a capacitor, but responds to them as a resistive impedance. Thereby, the capacitor does not smooth the edges but enables the edges to be coupled to the load as two very short duration bipolar pulses separated from each other by approximately ten microseconds. The two bipolar short duration pulses have frequently been of sufficient amplitude to destroy the load or have serious deleterious effects thereon, even with the insertion of a regulator between the converter and the load. Matching the impedance of the capacitor to that of the converter transformer inductance has been unsuccessfully attempted to obviate the problem.

It is, accordingly, an object of the present invention to provide a new and improved apparatus for substantially decoupling DC loads from AC power line spikes which have a tendency to be coupled to the loads through AC to DC converters.

Another object of the present invention is to provide a new and improved circuit for decoupling DC loads from bipolar pulses induced across output terminals of an AC to DC converter including a step-down transformer and electrolytic capacitor.

Another object of the invention is to provide a new and improved circuit for substantially decoupling DC loads from bipolar pulses resulting from spikes on an AC line coupled through a stepdown transformer to an AC to DC converter rectifier bridge including an electrolytic output capacitor that is unable to function as a capacitor to frequency components in leading and trailing edges of the bipolar pulses.

A further object of the present invention is to provide a circuit for substantially decoupling pulses on an AC line from a DC load connected to the line by an AC to DC converter, wherein it is not necessary to provide an impedance match between the converter and the load.

SUMMARY OF THE INVENTION

In accordance with the present invention a circuit for substantially preventing coupling of spikes occurring on an AC line through an AC to DC converter to a DC load is provided. The converter includes a supply transformer and a shunt electrolytic filter capacitor. The transformer and other reactances of the converter have a tendency to develop pulses in response to the spikes. The pulses have a tendency to be bipolar relative to a DC output voltage developed by the converter across the DC load. The pulses have components at a sufficiently high frequency such that the electrolytic capacitor responds to them as a resistive impedance, rather than as a capacitive impedance.

The decoupling circuit comprises a shunt network including bidirectional breakdown means having a predetermined threshold conduction level with a dead band. The breakdown means is series connected with a first capacitor that functions as: a low impedance capacitive reactance to the high frequency components, a very high capacitive reactance to the DC derived by the converter, and a high impedance to the frequency of the line and measurable harmonic components thereof, such as ripple developed by the AC to DC converter. The breakdown means has a zero DC voltage across it during normal operation of the converter. The first shunt capacitor is biased to a voltage approximately equal to the converter output voltage and conducts substantially no current during normal converter operation. High frequency current components are supplied by the breakdown means to and through the first capacitor to momentarily interrupt the flow of current from the converter to the load in response to derivation of one of the bipolar pulses having an amplitude in excess of the breakdown voltage in either polarity direction.

A low pass filter is connected in series with the shunt network and the load. The low pass filter includes a second shunt capacitor that functions as a very low capacitive reactance to the high frequency components, a very high impedance capacitive reactance to the DC developed by the converter and a low impedance to the frequency of the line and measurable harmonic components thereof, to filter ripple in the output of the converter. The low pass filter thus has a cut-off frequency lower than the ripple of the AC line.

In a preferred embodiment, the breakdown means includes a pair of semiconductor diodes connected in parallel branches. The diodes have oppositely poled electrode connections so one of the branches provides a low impedance to pulses of a first polarity and a high impedance to pulses of a second polarity; the other branch provides a low impedance to pulses of the second polarity and a high impedance to pulses of the first polarity. It is to be understood, however, that the breakdown means may have other configurations, such as a pair of series connected, oppositely polarized Zener diodes.

In the preferred embodiment, the low pass filter includes a series inductor to assist in providing the desired ripple attenuation and attenuation of the high frequency pulse components. A DC regulator is also preferably connected in series between the converter and the load to assure that the load voltage remains relatively constant, despite variations in the AC supply voltage.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWING

FIG. 1 is a circuit diagram of a preferred embodiment of the invention;

FIG. 2A is a voltage waveform derived at the output of a converter bridge in the circuit illustrated in FIG. 1;

FIG. 2B is a waveform of the voltage developed across the DC load of the circuit illustrated in FIG. 1 if the present invention is not included; and FIG. 2C is a waveform of the voltage appearing across the load of the circuit illustrated in FIG. 1, when the present invention is used.

DETAILED DESCRIPTION OF THE PREFERRED EMBODIMENT

Reference is now made to FIG. 1 of the drawing wherein AC source 11, typically a 120 volt, 60 Hertz source, is connected to AC power line 12, in turn connected to a conventional AC to DC converter 13. Converter 13 drives in seriatium low pass filter 14, network 15, regulator 16, and DC load 17.

Converter 13 includes stepdown transformer 21 having primary and secondary windings 22 and 23 and magnetic core 24. Terminals 25 of winding 22 are connected to power line 12, while terminals 26 of winding 23 are connected to input terminals of rectifier bridge 27. Rectifier bridge 27 includes diodes 31–34 connected so that input terminals of the bridge are connected directly to output terminals 26 of transformer 21. A common connection between the anode of diode 31 and cathode of diode 33 is connected to one of the transformer output terminals, while a common connection for the anode of diode 34 and the cathode of diode 32 is connected to the other output terminal 26. Common terminal 35 at the anodes of diodes 31 and 34 is one output terminal 35 of bridge 27; the other bridge output terminal 36 is at the common anode terminals of diodes 32 and 33. Electrolytic capacitor 37 shunts output terminals 35 and 36; for a positive voltage across load 17, terminal 36 is grounded.

For a typical stepdown ratio between windings 22 and 23, and a desired voltage across load 17 of +5 volts, the DC voltage between terminals 35 and 36 is slightly above 5.0 volts; a typical value is 5.5 volts. The voltage across load 17 is regulated to 5.0 volts by regulator 16, including the collector-emitter path of NPN transistor 41, connected so that the collector and emitter of the transistor are respectively connected to network 15 and load 17. Transistor 41 includes a base electrode, connected to ground through Zener diode 42. Zener diode 42 is connected so that the anode thereof is grounded, while the cathode thereof is connected directly to the base of transistor 41. The collector and emitter of transistor 41 are respectively shunted by electrolytic, smoothing capacitors 43 and 44.

Spikes have a tendency to be induced on line 12 for various reasons. Because of the reactance, both inductive and capacitance, of transformer 21, the spikes have a tendency to be coupled across output terminals 35 and 36 as a voltage waveform of the type illustrated in FIG. 2A. The waveform of FIG. 2A includes bipolar pulse 46 superimposed on a DC level, typically having a value of 5.5 volts. Bipolar pulse 46 usually includes a very short duration, steep leading edge 47, having a duration of 0.1 microseconds and an amplitude of 25 volts, whereby the peak voltage of the pulse is approximately 30 volts. Leading edge 47 is followed by a sinusoidal-like variation 48, having a total peak to peak change of typically 50 volts, whereby the final value of variation 48 is −20 volts. Variation 48 is followed by a positive going trailing edge 49, having a duration of 0.1 microseconds.

Electrolytic capacitors 37, 43 and 44 are incapable of responding to the very high frequency components subsisting in leading and trailing edges 47 and 49. As a result, if the present invention including low pass filter 14 and network 15 is not employed and regulator 16 is connected directly to terminals 35 and 36, the voltage developed across load 17 in response to bipolar pulse 46 has a wave shape of the type illustrated in FIG. 2B. The wave shape illustrated in FIG. 2B includes positive and negative short duration pulses 51 and 52, respectively having maximum values of +30 volts and −20 volts. Pulses 51 and 52 have leading and trailing edges with a duration on the order of a microsecond or less, with a separation between them of approximately 10 microseconds. Short duration pulses 51 and 52 frequently have a destructive or deleterious effect on load 17.

In accordance with the present invention, pulses 51 and 52 are decoupled from load 17 by employing low pass filter 14 and network 15, whereby bipolar pulse 46 is converted into the waveform of FIG. 2C. The waveform of FIG. 2C includes relatively low amplitude positive and negative variations, typically having values of ±0.5 volts, superimposed on a 5.0 volt DC level. In particular, the waveform of FIG. 2C includes a positive half wave rectified sinusoidal like variation 53, having a peak value of 5.5 volts, followed by a negative half wave rectified sinusoidal-like variation 54, having a peak deviation of −0.5 volts from the 5.0 voltage across load 17; thus, the minimum value of variation 54 is +4.5 volts. Sinusoidal like variations 53 and 54 subsist for several microseconds.

To achieve the stated results, low pass filter 14 includes a series inductor 61, and a shunt metallic, i.e., not electrolytic, capacitor 62. Because capacitor 62 is not electrolytic, it functions as a capacitor to the high frequency components in the leading and trailing edges 47 and 49 of bipolar pulse 46, to substantially attenuate these components. The values of inductor 61 and capacitor 62 are selected so that the corner frequency of filter 14 is less than the ripple voltage developed across terminals 35 and 36, i.e., the corner frequency of filter 14 is less than twice the frequency of power source 11. Of course, the ripple frequency developed across terminals 35 and 36 has a minimum value equal to twice the frequency of source 11 because of the full wave rectifying properties of bridge 27. Because the values of inductor 61 and capacitor 62 are selected in this manner, low pass filter 14 passes the DC components in the full wave rectified voltage developed between terminals 35 and 36 with virtually no attenuation, imposes a substantial amount of attenuation on all of the ripple components developed across terminals 35 and 36, and introduces a very high impedance into all of the components of bipolar pulse 46.

Network 15, connected between low pass filter 14 and regulator 16, is a shunt network including a bidirectional breakdown device 63 having a predetermined threshold conduction level with a dead band. Device 63 is connected in series with metallic capacitor 64, which functions as a capacitive reactance to the leading and trailing edges 47 and 49, as well as sinusoidal variation 48 of bipolar pulse 46. The value of capacitor 64 is selected so that it has a relatively high impedance to the ripple components of source 11, as derived between terminals 35 and 36, i.e., to twice the frequency of source 11. In contrast, capacitor 62 has a relatively low impedance to the ripple components, enabling filter 14 to function as a low pass filter for the ripple components, as well as the high frequency components in wave portions 47, 48 and 49 of pulse 46. Thereby, the combination of filter 14 and network 15 provides effective attenuation for both ripple components and the components in pulse 46. In the preferred embodiment, bipolar breakdown device 63 includes parallel, back to back silicon diodes 65 and 66, connected so that the anode and cathode of diode 65 are respectively connected to the common terminal for inductor 61 and capacitor 62 and one electrode of capacitor 64; the anode and cathode of diodes 66 have opposite connections to the common terminal of inductor 61 and capacitor 62, and one electrode of capacitor 64. Diodes 65 and 66, being silicon devices, inherently have breakdown voltages of 0.7 volts.

During normal operation, no current flows through diodes 65 or 66 and a DC voltage is maintained across capacitor 64; the voltage across capacitor 64 is between the output voltage of rectifier 27, between terminals 35 and 36 and the voltage across load 17, and is typically 5.25 volts during normal operation. In response to pulse 46 being derived between terminals 35 and 36 in response to a spike on line 12, there is derived at terminal 60 a waveform including positive and negative components deviating from 5.25 volts by more than the breakdown voltages of diodes 65 and 66. The variations include relatively high frequency components, despite the attenuation effects of inductor 61 and capacitor 62. In response to the positive going variation, diode 65 conducts so that capacitor 64 is directly connected between terminal 60 and ground. The series impedance of diode 65 and the impedance of capacitor 62 to the high frequency positive components at terminal 60 is such that there is virtually a shunt discontinuity between terminal 60 and ground through the network 15 when the positive variation is derived. A similar discontinuity is provided for the negative variation which is coupled through capacitor 64 in response to diode 66 breaking down. Because of the discontinuity resulting from the breakdown of diodes 65 and 66 and the low impedance of capacitor 64, there is no feedback from capacitors 43 and 44 to the inductive reactance of transformer 21. Because there is no feedback between output capacitors 43 and 44 and transformer 21, it is not necessary to match load impedance 17 to the transformer inductance between output transformer terminal 26.

While there has been described and illustrated one specific embodiment of the invention, it will be clear that variations in the details of the embodiment specifically illustrated and described may be made without departing from the true spirit and scope of the invention as defined in the appended claims. For example, if it is desired to establish a higher breakdown voltage than 0.7 volts for breakdown device 63, diodes 65 and 66 can be replaced by plural series connected silicon diodes, whereby the breakdown voltage equals $N \times 0.7$ volts, where N is the number of series connected diodes. Also, it is possible to utilize back to back series connected Zener diodes for breakdown device 63, as disclosed in my U.S. Pat. No. 4,095,163. It is also possible to rearrange the circuits so that low pass filter 14 and network 15 are both connected to the output of regulator 16, or so that one of filter 14 or network 15 is connected to the input of regulator 16, and one of filter 14 or network 15 is connected to the output of regulator 16. In other words, regulator 16 can be connected between filter 14 and network 15, or the regulator can be directly connected to terminals 35 and 36 and filter 14 and network 15 can be connected between the regulator output and the input to load 17. Also, the connections of filter 14 and network 15 can be reversed so that the input of the filter is shunted by the network, rather than vice versa.

I claim:

1. A circuit for substantially preventing coupling of spikes occurring on an AC line through an AC to DC converter to a DC load of the converter, the converter including a supply transformer and a shunt filter capacitor, the supply transformer and other reactances of the converter having a tendency to develop pulses in response to the spikes, the pulses having a tendency to be bipolar relative to an output voltage developed by the converter, the pulses having components at a sufficiently high frequency such that the shunt capacitor responds to them as a resistive impedance and not as a capacitive impedance, the circuit comprising a shunt network including a bidirectional breakdown means having a predetermined threshold conduction level with a dead band series connected with a first capacitor that functions as: a low impedance capacitive reactance to the high frequency components, a very high impedance capacitive reactance to the DC derived by the converter, and a high impedance to the frequency of the line, the breakdown means having a zero DC voltage across it during normal operation of the converter, the first shunt capacitor being biased to a voltage equal approximately to the converter output voltage and conducting substantially no current during normal operation of the converter, high frequency current components being supplied by the breakdown means and through the first capacitor to momentarily interrupt the flow of current from the converter to the load in response to derivation of one of the pulses having an amplitude in excess of the breakdown voltage in either direction; and low pass filter means connected in series with the shunt network and the load, the low pass filter including a shunt second capacitor that functions as: a very low impedance capacitive reactance to the high frequency components, a very high impedance capacitive reactance to the DC derived by the converter, and a low impedance to the frequency of the line, the low pass filter having a cut-off frequency lower than a ripple frequency of the AC line as derived by the converter.

2. The circuit of claim 1 wherein the breakdown means includes a pair of semiconductor diodes connected in parallel branches, said diodes having oppositely poled electrode connections so one of the branches provides a low impedance to pulses of a first polarity and high impedance to pulses of a second polarity and the other branch provides a low impedance to pulses of the second polarity and a high impedance to pulses of the first polarity.

3. The circuit of claim 2 wherein the low pass filter includes a series inductor.

4. The circuit of claim 3 further including a DC regulator connected in series between the converter and the load.

5. The circuit of claim 1 wherein the low pass filter includes a series inductor.

6. The circuit of claim 5 further including a DC regulator connected in series between the converter and the load.

7. The circuit of claim 1 further including a DC regulator connected in series between the converter and the load.

8. In combination with an AC line suspectible of having spikes developed thereon and a DC load, an AC to DC converter connected to be responsive to the AC line for developing a DC voltage, the converter including a supply transformer and a shunt filter capacitor, the transformer and other reactances of the converter having a tendency to develop pulses in response to the spikes, the pulses having a tendency to be bipolar relative to an output voltage developed by the converter, the pulses having components at a sufficiently high frequency such that the shunt capacitor responds to them as a resistive impedance and not as a capacitive impedance a shunt network including a bidirectional breakdown means having a predetermined threshold conduction level with a dead band series connected with a first capacitor that functions as: a low impedance capacitive reactance to the high frequency components, a very high impedance capacitive reactance to the DC derived by the converter, and a high impedance to the frequency of the line, the breakdown means having a zero DC voltage across it during normal operation of the converter, the first shunt capacitor being biased to a voltage equal approximately to the converter output voltage and conducting substantially no current during normal operation of the converter, high frequency current components being supplied by the breakdown means to and through the first capacitor to momentarily interrupt the flow of current from the converter to the load in response to derivation of one of the pulses having an amplitude in excess of the breakdown voltage in either direction; and low pass filter means connected in series with the shunt network and the load, the low pass filter including a shunt second capcitor that functions as: a very low impedance capacitive reactance to the high frequency components, a very high impedance capacitive reactance to the DC derived by the converter, and a low impedance to the frequency of the line, the low pass filter having a cut-off frequency lower than a ripple frequency of the AC line as derived by the converter.

9. The combination of claim 8 wherein the breakdown means includes a pair of semiconductor diodes connected in parallel branches, said diodes having oppositely poled electrode connections so one of the branches provides a low impedance to pulses of a first polarity and high impedance to pulses of a second polarity and the other branch provides a low impedance to pulses of the second polarity and a high impedance to pulses of the first polarity.

10. The combination of claim 9 wherein the low pass filter includes a series inductor.

11. The combination of claim 10 further including a DC regulator connected in series between the converter and the load.

12. The combination of claim 8 wherein the low pass filter includes a series inductor.

13. The combination of claim 12 further including a DC regulator connected in series between the converter and the load.

14. The combination of claim 8 further including a DC regulator connected in series between the converter and the load.

15. A circuit for substantially preventing coupling of spikes occurring on an AC line through an AC to DC converter to a DC load of the converter, the converter including a supply transformer and a shunt electrolytic filter capacitor, the transformer and other reactances of the converter having a tendency to develop pulses in response to the spikes, the pulses having a tendency to be bipolar relative to an output voltage developed by the converter, the pulses having components at a sufficiently high frequency such that the electrolytic capacitor responds to them as a resistive impedance and not as a capacitive impedance, the circuit comprising a shunt network including a bidirectional breakdown means having a predetermined threshold conduction level with a dead band series connected with a first capacitor that functions as: a low impedance capacitive reactance to the high frequency components, a very high impedance capacitive reactance to the DC derived by the converter, and a high impedance to the frequency of the line, the breakdown means having a zero DC voltage across it during normal operation of the converter, the first capacitor being biased to a voltage equal approximately to the converter output voltage and conducting substantially no current during normal operation of the converter, high frequency current components being supplied by the breakdown means to and through the first capacitor to momentarily interrupt the flow of current from the converter to the load in response to derivation of one of the pulses having an amplitude in excess of the breakdown voltage in either direction; and low pass filter means connected in series with the shunt network and the load, the low pass filter including a shunt second capacitor that functions as: a very low impedance capacitive reactance to the high frequency components, a very high impedance capacitive reactance to the DC derived by the converter, and a low impedance to the frequency of the line, the low pass filter having a cut-off frequency lower than a ripple frequency of the AC line as derived by the converter.

16. In combination with a DC voltage source and a DC load, the source having a tendency to develop pulses in response to disturbances coupled to it, the pulses having a tendency to be bipolar relative to a DC output voltage developed by the source, a shunt network including a bidirectional breakdown means having a predetermined threshold conduction level with a dead band series connected with a first capacitor that functions as: a low impedance capacitive reactance to the high frequency components, and a very high impedance capacitive reactance to the DC derived by the converter, the breakdown means having a zero DC voltage across it during normal operation of the converter, the first shunt capacitor being biased to a voltage equal approximately to the source DC output voltage and conducting substantially no current during normal operation of the source, high frequency current components being supplied by the breakdown means to and through the first capacitor to momentarily interrupt the flow of current from the supply to the load in response to derivation of one of the pulses having an amplitude in excess of the breakdown voltage in either direction; and low pass filter means connected in series with the shunt network and the load, the low pass filter including a shunt second capacitor that functions as: a very low impedance capacitive reactance to the high frequency components, and a very high impedance capacitive reactance to the DC derived by the converter.

17. The combination of claim 16 wherein the source includes a shunt filter capacitor, the pulses having components at a sufficiently high frequency such that the shunt capacitor responds to them as a resistive impedance and not as a capacitive impedance.

18. The combination of claim 17 wherein the shunt capacitor is an electrolytic capacitor.

19. The combination of claim 17 wherein the breakdown means includes a pair of semiconductor diodes connected in parallel branches, said diodes having oppositely poled electrode connections so one of the branches provides a low impedance to pulses of a first polarity and high impedance to pulses of a second polarity and the other branch provides a low impedance to pulses of the second polarity and a high impedance to pulses of the first polarity.

20. The combination of claim 18 wherein the low pass filter includes a series inductor.

21. The combination of claim 16 wherein the breakdown means includes a pair of semiconductor diodes connected in parallel branches, said diodes having oppositely poled electrode connections so one of the branches provides a low impedance to pulses of a first polarity and high impedance to pulses of a second polarity and the other branch provides a low impedance to pulses of the second polarity and a high impedance to pulses of the first polarity.

* * * * *